United States Patent [19]

Heinen

[11] Patent Number: 4,654,084
[45] Date of Patent: Mar. 31, 1987

[54] METHOD FOR CONTROLLING CONTRACTION IN SETTING CEMENTITIOUS SYSTEMS

[75] Inventor: John A. Heinen, Wyckoff, N.J.

[73] Assignee: Construction Products Research Inc., Fairfield, Conn.

[21] Appl. No.: 541,036

[22] Filed: Oct. 12, 1983

[51] Int. Cl.$^4$ ............ C04B 7/00; C04B 9/00; C04B 7/02
[52] U.S. Cl. .................. 106/87; 106/90; 106/86; 106/315; 106/88
[58] Field of Search ............ 106/86, 87, 315, 88, 106/90

[56] References Cited

U.S. PATENT DOCUMENTS

| | | | |
|---|---|---|---|
| 3,287,145 | 11/1966 | Fischer | 106/90 |
| 3,663,287 | 5/1972 | Mizunuma et al. | 106/315 |
| 3,776,746 | 12/1973 | Abe | 106/84 |
| 4,131,578 | 12/1978 | Crinkelmeyer et al. | 260/17.5 |
| 4,209,335 | 6/1980 | Katayama et al. | 106/315 |
| 4,333,764 | 6/1982 | Richardson | 106/87 |

FOREIGN PATENT DOCUMENTS

| | | | |
|---|---|---|---|
| 45-8000 | 3/1970 | Japan | 106/90 |
| 0033545 | 8/1981 | Japan | 106/87 |

Primary Examiner—William R. Dixon, Jr.
Assistant Examiner—Ann M. Knab
Attorney, Agent, or Firm—Pennie & Edmonds

[57] ABSTRACT

The contractions of aqueous hydraulic cement mixtures in the plastic state is controlled by the addition of a gas generating agent capable of generating gas in the mixture without the addition of activators or other agents, and which does not generate disagreeable or noxious ammonia fumes. The gas generation may be controlled over an extended period of time so that even slow setting cementitious mixtures may have their shrinkage or contraction inhibited while in the plastic state during setting or hardening without the generation of ammonia fumes.

22 Claims, No Drawings

METHOD FOR CONTROLLING CONTRACTION IN SETTING CEMENTITIOUS SYSTEMS

DESCRIPTION

1. Field of the Invention

This invention relates to an improved method and composition for inhibiting shrinkage in cementitious systems during setting and hardening and more particularly to a method and composition for controlling the contraction of such cementitious systems through the addition of gas generating additives.

The term "cementitious systems" as used herein is intended to include compositions which generally possess the characteristic of hardening under water and includes, for example, soluble hydraulic cement, hydraulic lime, gypsum, and like materials, as well as mixtures of the foregoing with aggregates and water such as concrete, mortar, grout, and products made therefrom.

2. Description of the Prior Art

Various methods and means for inhibiting shrinkage of hydraulic cement mixtures during setting and hardening have previously been suggested. These methods have included the addition to such mixtures of gas delivering agents such as aluminum powder and expansion agents such as iron filings. These procedures have been impractical due to, among other reasons, a lack of adequate control of expansion and production of a non-uniform product. It has also been found that certain other unique materials can eliminate shrinkage in concrete. It is theorized that those materials eliminate shrinkage by releasing entrapped gas upon absorption of water from the cementitious system. Thus, materials such as fluid coke, a combination of fluid coke and delayed coke, both products of the petroleum industry, and porous particulate materials such as the so called industrial absorbents have been used with various types of cementitious mixtures to successfully inhibit shrinkage. Examples of these materials can be found in U.S. Pat. Nos. 3,503,767, 3,519,449, 3,591,354, 3,794,504, 3,890,157, and Re. 26,597.

In addition to this art, U.S. Pat. No. 4,142,909 discloses an improved method and composition for inhibiting shrinkage wherein certain blowing agents are added instead of the materials of the prior art. According to that invention, nitrogen forming chemicals such as azodicarbonamide, sodium azodicarboxylate, and p-toluene sulfonyl hydrazide, as well as organic peroxides and sodium borohydride, are added to provide such advantageous characteristics which are useful for shrinkage inhibition and control of contraction of cementitious systems during setting and hardening without the need for specific temperature control or the addition of activating agents, as did previous inventions such as U.S. Pat. No. 3,591,354.

It has now been discovered that while the additives of U.S. Pat. No. 4,142,909 do perform well, they have a significant disadvantage of producing disagreeable and potentially harmful amounts of ammonia fumes. The present invention resolves this troublesome and dangerous gas generation, while still providing a method and composition for inhibiting shrinkage in cementitious systems, by the addition of additives capable of forming gases which are non-toxic and not harmful.

DESCRIPTION OF THE INVENTION

Applicant has found that dinitrosopentamethylenetetramine (DNPT) used alone or in conjunction with an accelerator will inhibit the shrinkage or produce expansion in the plastic state of hydraulic cement compositions without giving off the disagreeable and potentially harmful odor of ammonia fumes. The DNPT does not require the use of an activator nor does it require internal or external applied heat to decompose. The action of the DNPT takes place during the entire period that the cementitious mixture is in the plastic state. The gas generation mechanism may be enhanced by the use of an accelerator in conjunction with the DNPT.

It should be noted that DNPT is not a hydrogen derivative nor is it a diazonium compound. It is based on hexamethylenetetramine and is classified as a cyclic amine. A DNPT compound which can be used as the additive is commercially available under the trade name of OPEX 93 from the Olin Corporation. The accelerator that can be used in conjunction with DNPT is chosen from the group consisting of soluble sulfates, with ferrous sulfate being preferred. Although sulfates in general are not desireable additions to cementitious materials, the very small but effective amounts used in this invention are not harmful to the overall composition.

Although the amount of gas generating agent can vary depending upon the exact cementitious composition, this agent is generally added in an amount of about 0.1 to 5.0 weight percent based on the weight of the non-aqueous constituents of the cementitious system.

In carrying out this invention, the gas generating additive may be added to and mixed with cement or any type of cement mixture at any time prior to or during the addition of water to form aqueous cement mixtures. For example, in preparing grout or mortar, the dry additive may be mixed with cement or cement and fine aggregates to form a dry cement mixture which is subsequently mixed with the desired amount of water to form grout or mortar. Similarly, to prepare concrete, the additive may be mixed with the cement and aggregates to form a dry mixture which is then used to form the concrete during stationary or truck mixing. On the other hand, it may also be advantageous to mix all the ingredients including the additive in the stationary and/or truck mixture to form ready mixed concrete.

The gas generating additive of this invention may also be used in conjunction with other additives or agents which inhibit shrinkage during the setting or hardening of cementitious systems. Furthermore, this combination of agents can be added to the cementitious composition as an admixture, or each component can be added individually in any order.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

EXAMPLES

The scope of the invention is further described in connection with the following examples which are set forth for purposes of illustration only and are not to be construed as limiting the scope of the invention in any manner.

3

In these examples, the performance of the additive is judged by the expansion or the contraction of the system as soon as it is mixed with water and cast in cylindrical molds. The expansion or contraction was determined in accordance with ASTM C-827, Method of Test For Early Volume Change of Cementitious Mixtures. The tests consists of using a focus light beam to project a shadow of the top surface on to a screen equipped with vertical graduations in inch units.

EXAMPLE 1

The following mixture was prepared: 425 grams ASTM C-150 Type III cement, 575 grams fine sand, 21.25 grams Opex 93, and 208 grams water. The testing was performed according to ASTM C-827, and at the end of a 6 hour and 15 minute period, the expansion was found to be 0.30%.

EXAMPLE 2

The following mixture was prepared: 425 grams ASTM C-150 Type III cement, 575 grams fine sand, and 208 grams water. After mixing the composition was tested according to ASTM C-827. At the end of a 6 hour period, the contraction measured as 0.90%. In comparison to Example 1, it is seen that the addition of Opex 93, was sufficient to overcome the contraction and produce an additional 0.30% expansion.

EXAMPLE 3

The following mixture was made: 425 grams ASTM C-150 Type III cement, 575 grams fine sand, 8.8 grams admixture, and 220 grams water. The admixture was composed of 94.3% ferrous sulfate heptahydrate as accelerator and 5.7% Opex 93. The composition was tested according to ASTM C-827. At the end of a two hour and 45 minute period the expansion was found to be 7.3%.

EXAMPLE 4

The composition according to Example 3 was repeated, but this time only one half the amount of the admixture (4.4 grams) was used. At the end of a 4 hour and 25 minute period, the expansion was measured as 3.65%.

EXAMPLE 5

The following mixture was made: 850 grams ASTM C-150 Type I cement, 1150 grams fine sand, 9.6 grams admixture, and 458.5 grams water. After seven hours, this mixture showed 3.15% expansion. The admixture was the same composition as that of Example 3. This example further shows that any type cement will exhibit the same expansion characteristics.

EXAMPLE 6

425 grams ASTM C-150 Type I cement, 575 grams fine sand, 4 grams admixture, and 187.5 grams water were mixed together to form a composition. All ingredients had been held at 35° F. overnight before mixing. The temperature at the end of mixing was 52° F. This mixture was kept in a 35° F. ambient, except for the one minute periods it was removed each time to test according to ASTM C-827. At the end of 22½ hours, the expansion was measured as 0.6%. This example demonstrates that the system would be efficient regardless of the effect of a lower concrete mix and ambient temperatures as is the case with other prior art gas generating additives.

Having thus described my invention, what I claim as new and desire to secure by Letters Patent is:

1. A method of controlling contraction of hydraulic cementitious systems in the plastic state during setting and hardening comprising adding to the system a gas generating organic agent having a normal thermal decomposition temperature above the temperatures encountered during the setting and hardening of the hydraulic cementitious system, without activators, capable of chemically generating gas in the system during setting and hardening when a liquid for setting and hardening is present therein without the addition of activating agent additives and without specific temperature control other than the ordinary ambient temperature conditions of setting and hardening being necessary for gas generation in an amount effective to counteract the contraction tendency of the cementitious system while in the plastic state, and which further does not generate any disagreeable or potentially harmful ammonia fumes.

2. The method according to claim 1 wherein the gas generating organic agent is dinitrosopentamethylenetetramine.

3. The method according to claim 1 wherein an accelerator is also added to the gas generating agent.

4. The method according to claim 3 wherein said accelerator is selected from the group consisting of soluble sulfates.

5. The method according to claim 4 wherein said soluble sulfate is ferrous sulfate-heptahydrate.

6. The method according to claim 2 wherein the amount of said dinitrosopentamethylenetetramine is about 0.1 to 5.0 weight percent based on the weight of the non-aqueous constituents of the cementitious system.

7. The method according to claim 3 wherein the total amount of gas generating agent and accelerator is about 0.1 to 5.0 weight percent based on the weight of the non-aqueous constituents of the cementitious system.

8. The method according to claim 7 wherein the accelerator ranges from 1 to 99% of the total effective amount of additive and the gas generating agent correspondingly ranges from 99 to 1%.

9. The method according to claim 1 wherein the gas is capable of being generated for a period of at least five hours.

10. The method according to claim 3 wherein the gas is capable of being generated for a period of at least five hours.

11. A cementitious compostion which, when mixed with water, is capable of setting into a hard mass without substantial shrinkage in the plastic state during setting and hardening comprising a hydraulic cement mixture and a gas generating organic agent having a normal thermal decomposition temperature above the temperatures encountered during the setting and hardening of the hydraulic cementitious system, without activators, capable of chemically generating gas in the presence of hydraulic cement and water during setting and hardening without the presence of other constituents and without specific temperature control other than the ordinary ambient temperature conditions of setting and hardening being necessary for gas generation in an amount effective to counteract the shrinkage tendency of the cementitious composition while in the plastic state, and which further does not generate any disagreeable or potentially harmful ammonia gases.

12. The cementitious composition according to claim 11 wherein the gas generating agent is dinitrasopentamethylenetetramine.

13. The cementitious composition according to claim 11 wherein an accelerator is also adding to the gas generating agent.

14. The composition according to claim 13 wherein said accelerator is selected from the group consisting of soluble sulfates.

15. The composition according to claim 14 wherein said soluble sulfate is ferrous sulfate-heptahydrate.

16. The composition according to claim 12 wherein the effective amount of additive is about 0.1 to 5.0 weight percent based on the weight of the non-aqueous constituents of the cementitious system.

17. The composition according to claim 13 wherein the total amount of gas generating agent and accelerator is about 0.1 to 5.0 weight percent based on the weight of the non-aqueous constituents of the cementitious system.

18. The composition according to claim 17 wherein the accelerator ranges from 1 to 99% of the total effective amount of additive and the gas generating agent correspondingly ranges from 99 to 1%.

19. The composition according to claim 11 wherein the gas is capable of being generated for a period of at least five hours.

20. The composition according to claim 13 wherein the gas is capable of being generated for a period of at least five hours.

21. A method for controlling contraction of a hydraulic cementitious system in the plastic state during setting and hardening without generating any disagreeable or potentially harmful amonia fumes which comprises adding dinitrosopentamethylenetetramine in an amount effective to chemically generate gas in the system to counteract the contraction tendency of the system in the plastic state during setting and hardening when a liquid for setting and hardening is present therein without the addition of activating agents and without specific temperature control other than the ordinary ambient temperature conditions for setting and hardening.

22. A method for controlling contraction of a hydraulic cementitious system in the plastic state during setting and hardening without generating any disagreeable or potentially harmful ammonia fumes which comprises adding a gas generating component comprising from 99 to 1% dinitrosopentamethylene-tetramine and from 1 to 99% of ferrous sulfate heptahydrate in an amount of from about 0.1 to 5.0 weight percent based on the weight of the non-agueous constitutents of the system to chemically generate gas in the system to counteract the contraction tendency of the system in the plastic state during setting and hardening when a liquid for setting and hardening is present therein without the addition of activating agents and without specific temperature control other than the ordinary ambient temperature conditions for setting and hardening.

* * * * *